(12) United States Patent
Lin

(10) Patent No.: US 8,200,009 B2
(45) Date of Patent: Jun. 12, 2012

(54) CONTROL OF OPTICAL CHARACTER RECOGNITION (OCR) PROCESSES TO GENERATE USER CONTROLLABLE FINAL OUTPUT DOCUMENTS

(76) Inventor: Bo-In Lin, Los Altos Hills, CA (US)

( * ) Notice: Subject to any disclaimer, the term of this patent is extended or adjusted under 35 U.S.C. 154(b) by 1408 days.

(21) Appl. No.: 11/788,889

(22) Filed: Apr. 22, 2007

(65) Prior Publication Data

US 2009/0208103 A1    Aug. 20, 2009

(51) Int. Cl.
*G06K 9/34* (2006.01)
(52) U.S. Cl. ........................................................ 382/173
(58) Field of Classification Search .................. 382/173, 382/176, 180–181, 209, 217–218, 321
See application file for complete search history.

(56) References Cited

U.S. PATENT DOCUMENTS 7,149,347 B1 * 12/2006 Wnek ............................ 382/159

OTHER PUBLICATIONS

SAIC, InTeGen V 1.2 Inductive Template Generator User Guide, SAIC-CM No. SAIC-99/1346&-In TeGen-UG-01-U-ROC2, Nov. 24, 1999, pp. 1-20.*

* cited by examiner

*Primary Examiner* — Ishrat I Sherali
(74) *Attorney, Agent, or Firm* — Bo-In Lin

(57) ABSTRACT

An optical character recognition (OCR) system that includes a user-input function for receiving a user input sample for executing said OCR system for optically recognizing a document to generate an output file using the user input sample as a reference.

14 Claims, 5 Drawing Sheets

| | | |
|---|---|---|
| Sourcebook Special Section | | |
| For additional information on the corporations and products mentioned in-fee section, visit their website or call the number listed below. | | |
| PRESENTATION TECHNOLOGIES | | |
| Multimedia Smarts-Power-point Software | | |
| Digital Juice-Presentation Technologies | | |
| www.imultimedia.com | | |
| 800-525-2203 | | |
| Crystal Graphics- Power Plugs | | |
| www.crystalgraphics.com | | |
| 408-496-6175 | | |
| Right Send Vox Proxy Version 3 | | |
| www.voxproxy.com | | |
| 303-278-2244 | | |
| Video To Go | | |
| LG Electronics-16x Super Multi DVD Rewriter | | |
| http://us.lge.com | | |
| 800-243-0000 | | |
| BenQ | | |
| www.benq.com | | |
| 866-700-2367 | | |
| HP | | |
| www.hp.com | | |
| | 800-752-0800 | 877-86S-SONY |
| | Pioneer | BenQ |
| | www.pioneerelectronics.com | www.IDenq.com |
| | Iomega | 866-760-2367 |
| | www.iomega.com | Pios |
| | 888-5T6-8456 | www.pius-america.com |
| | Plextor | 866-427-8835 |
| | www.plextor.com | Fujitsu |
| | 866-856-8357 | www.fujitsu.com/us |
| | LaCie | 800-831-3183 |
| | www.lacie.com | |
| | 503-844-4500 | BUSINESS PRODUCTIVITY |
| | Brilliant Shows-Projectors | Content Management |
| | Hitachi Performer | Adobe Acrobats |
| | www.hitachi.us/digitalmedia.com | www.adobe.com |
| | 650-589-8300 | 888-724-8508 |
| | NEC Visual Systems | |
| | www.neevisdai.systems.com | On Demand Offices |
| | 800-NEC-INFO | Regus |
| | InPocus | www.regus.com/ |
| | www.infocus.ooRi | productivity |
| | 800-294-6400 | 877-REGUS-47 |
| | Epson | |
| | www.epson.com | Input to Go |
| | 1-800-GO-EPSON | Planeo-, |
| | Sony | wiwsptacon.com |
| | www.sonystyle.com | 905^07-3926 |

Fig. 2A

| Company | Website | Telephone No. | Product Type | Remarks |
|---|---|---|---|---|
| HP | www.hp.com | 800-752-0900 | Presentaation Technologies | |
| BanQ | www.benq.com | 800-700-2367 | Presentation Tachnologies | |
| IOGear | www.IOGear.com | 866-9-IOGEAR | Business Productivity | |
| Logtech | www.logitech.com | 800-231-7717 | Business Productivity | |
| | | | | |
| | | | | |
| | | | | |
| | | | | |
| | | | | |

Fig. 2B

ACTION: COMPRESSION
STORE : ARCHIVE/PATENTS

CONTROL OF OPTICAL CHARACTER RECOGNITION (OCR) PROCESSES TO GENERATE USER CONTROLLABLE FINAL OUTPUT DOCUMENTS

BACKGROUND OF THE INVENTION

1. Field of the Invention

This invention relates generally to the scanning of a document into an image file by using a scanner for converting the image file into a machine-readable file by applying the technologies of optical character recognition (OCR). More particularly, this invention relates to an improved optical character recognition technologies for allowing more user control to generate final OCR output documents according to user designated document formats, content arrangements and user instructions of subsequent document processes.

2. Description of the Prior Art

Even though the optical character recognition (OCR) technologies for recognizing characters from the scanned images have made significant progresses in terms of recognition accuracy and processing speed, a user is still limited by the lack of flexibilities for controlling the desired file formats, document organization and content arrangements of the output file. As of now, many of the optical recognition programs are providing more intuitive controls for user to marked the desired scanned areas on the scanned images for optically recognizing only the designated areas. However, after marking out the scanned and ignored areas, and marking out some scanned areas for the OCR program to process as text or as graphic element, other than an option for a user to proof read the recognized text by the OCR program, a user still has very limited control over the desired data types, file formats and file types and the content organization and structure of the OCR outputs.

More specifically, the optical character recognition programs as now available are still image oriented. The optical character recognition program basically performs merely primitive recognition operations from raw image according to the location and shapes of the image elements. Almost all the intelligence and user control are directed to the checking the accuracy of the character recognition results and correction of the incorrect OCR output. Other than allowing a user to correct errors of character recognition, there is no further management and processes after the initial recognition operations. However, a user of the OCR often has other purposes than making sure all the image characters are correctly recognized. It is often required that the data and information included in a scanned document be further processed to produce a document that is further organized or tabulated to produce a file of certain formats. Conventional OCR techniques and programs however do not provide such user control functions and the practical usefulness of the OCR programs is therefore greatly limited.

Therefore, there is still a need in the art of optically scanning and recognizing a document to provide new and improved method and file management functions and features such that the above discussed limitations and difficulties can be overcome.

SUMMARY OF THE PRESENT INVENTION

It is one aspect of the present invention to provide additional user control features to an optical character recognition (OCR) program during the process of optically recognizing image characters. By applying these control features a user has more control of the output file types, the data formats, the document structures and different manners of content arrangements and presentations. The control features of the OCR program may include user input of one or several sample documents such that the OCR program may refer to these sample documents as reference to generate the output document. The OCR program may also be set up to allow the user to write the instructions directly on the document ready for inputting to a scanner. The instructions as written by the user can then be optically recognized and then applied to execute programs according to the user instructions that are optically recognized by the OCR program.

It is another aspect of the invention to provide the user an option for an OCR program to input real time user instructions. The OCR program then follows the real time user instructions to carry out either file process or data item rearrangements for the content of the document according to the user instruction as real time input to the OCR program.

It is another aspect of this invention to apply a reference document as a sample to serve as a "coach" or "guide" for an OCR program to generate an output document that follows the example presented in a reference document employed as a "what you see is what you get" instruction tool. The reference document is therefore a useful user's tool to generate a target output file with controllable content organization and structures.

Another aspect of the present invention is to provide a new and improved OCR program to enable an OCR user to input a sample document with a user designated file type and a reference format structure. An OCR program can apply the inputted file type and the format structure to convert the image file into the machine readable file comply with the user designated file type and format structure.

Another aspect of the present invention is to provide a new and improved OCR program to allow a user to input a real time instruction through a sequence of user actions of rearranging the optically recognized characters to generate an initial part of an exemplary output document. The OCR program then follows the patterns or rules as demonstrated by this sequence of user actions to generate an OCR output document.

Briefly, in a preferred embodiment, the present invention includes an optical character recognition (OCR) program for optically recognizing and converting character images into machine-readable characters. The OCR program further includes a command recognizing program for recognizing a command from said machine readable characters to execute a process according to said command. In a preferred embodiment, the command is to store a scanned document as a compressed document whereby the scanned document followed the command is compressed and ready for storage. In another preferred document, the command further includes a parameter as required for executing the process according to the command. In another preferred embodiment, the parameter is the location of storing the compressed document whereby the compressed document is stored in the file location designated by the parameter for executing the command.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 2A and 2B are an image document and a reference document respectively.

DETAILED DESCRIPTION OF THE PREFERRED EMBODIMENT

Figure 1A:
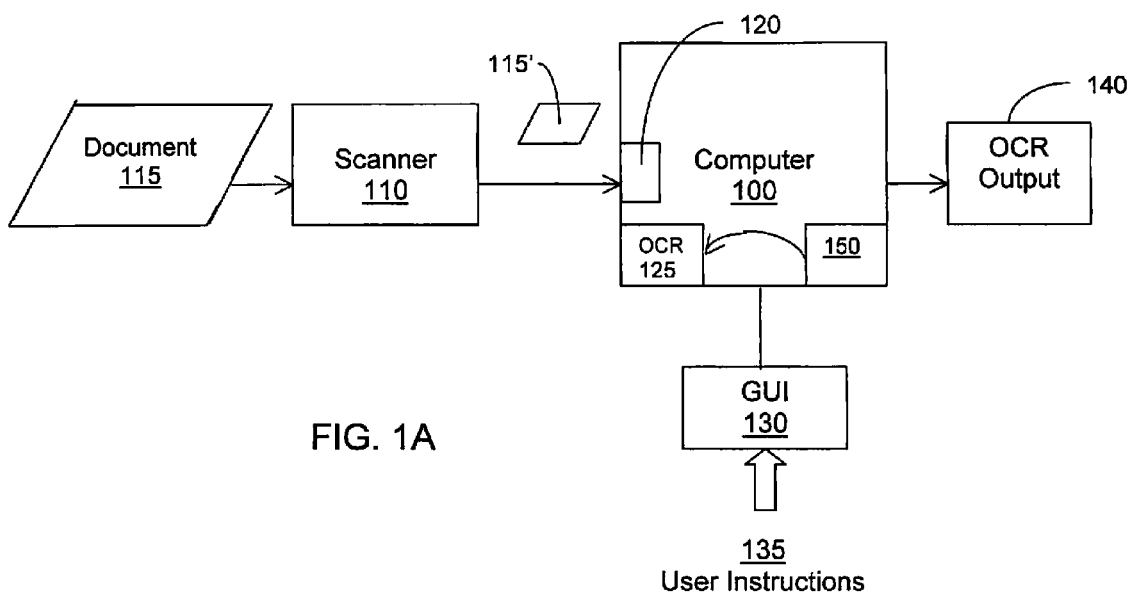
FIG. 1A is a system diagram to carry out an optical character recognition (OCR) program of this invention.

FIG. 1A is a functional block diagram for showing a computer 100 connected to scanner 110 for scanning a printed copy of a document 115. The computer 100 further includes a scanning program 120 to drive the scanner for capturing a scanned image 115' of the document 115. The computer 100 further includes an optical character recognition (OCR) program 125 to process the scanned image of the document 115 to convert the captured image file 115' into an electronically recognizable file such as a Microsoft Word, Excel or PowerPoint file. The computer further includes a graphic user interface (GUI) 130 for receive user instructions 135. The computer 100 receives the user instructions 135 for controlling the scanning process to generate and capture the image 115' of the document 115 and applying the OCR program 125 to process the image file to generate a OCR output file 140 as an electronically readable file. The computer 100 further receives a user instruction 135 through GUI 130 to apply a reference document 150 as a sample to generate the OCR output document 140. The reference document 150 can be applied in several ways according to the user's instructions 135. First of all, the OCR output document 140 can be generated according to the file type of the reference document. For example, if the reference document is a zip file with a particular data-compress format, the output of the OCR output document can be converted to a same "zip" file with identical data-compression format as the reference document. Of course there are broad selection of file formats a user can input through the GUI 130 for the OCR program 125 to generate an OCR output file according to the file format of the reference document 150.

Figure 1B:
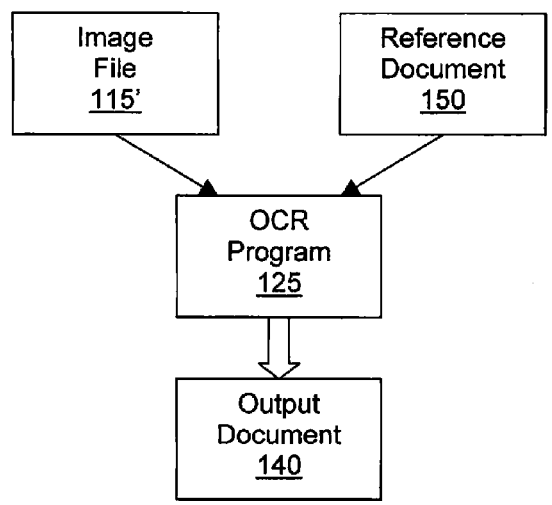
FIG. 1B is a flow chart showing a process for using a reference document as a sample for an OCR program.

The reference document 150 can also be inputted by the user through an input device of the computer 100 or can further be downloaded from a remote document source. Alternately, the reference can be inputted through the scanner 110 as another image document. FIG. 1B is a flow chart for showing the processes carried out by the OCR program 125. The OCR program receives first the image file as that scanned by the scanner 110 and also the reference document 150. The reference document 150 is used as a sample to generate the output document 140.

In addition to applying the file format of the reference document to generate an OCR output file having a same file format as the reference document, the content arrangements or document structure as presented in the reference document can also be employed to "coach" or guide the OCR program to generate the OCR output document to have a same content arrange or document structure as that presented in the reference document. FIG. 2A is an image copy of the input document 115 for scanning into an image file by the scanner 110. FIG. 2B shows an exemplary reference document 150 that is stored in a storage device in the computer 100 and retrieved by the OCR program 125 as instructed by the computer user. The reference document 150 is also inputted to the OCR program 125 as instructed by the user. In this exemplary embodiment, the reference document 150 is already an electronically readable file such as a Microsoft Excel file. The reference document when inputted to the OCR program 125 is employed by the OCR program as a reference to generate an OCR output document 140. Based on the reference document, the OCR program generates the output document 140 structured to have a same file format as the reference document 150. For example, since the reference document 150 inputted to the OCR program is a Microsoft Excel file, the OCR program generates the output document as a Microsoft Excel file. Furthermore, since the reference document 150, as shown in FIG. 2B, lists the company name in column 1, the e-mail address in column 2, the phone number in column 3, and the product type in column 4, the OCR program 125 follows the same pattern to generate an output document 140. Furthermore, since the reference document 150 only lists information on the lower part of the document 115, the OCR program generates the output 140 also lists information presented in the lower part and totally ignores the upper part of the document 115.

An example of applying the reference document is for an OCR program to compress the image document and store that compressed file in a specific location as the reference document having a same compressed data format as provided in the reference document.

Figure 3:
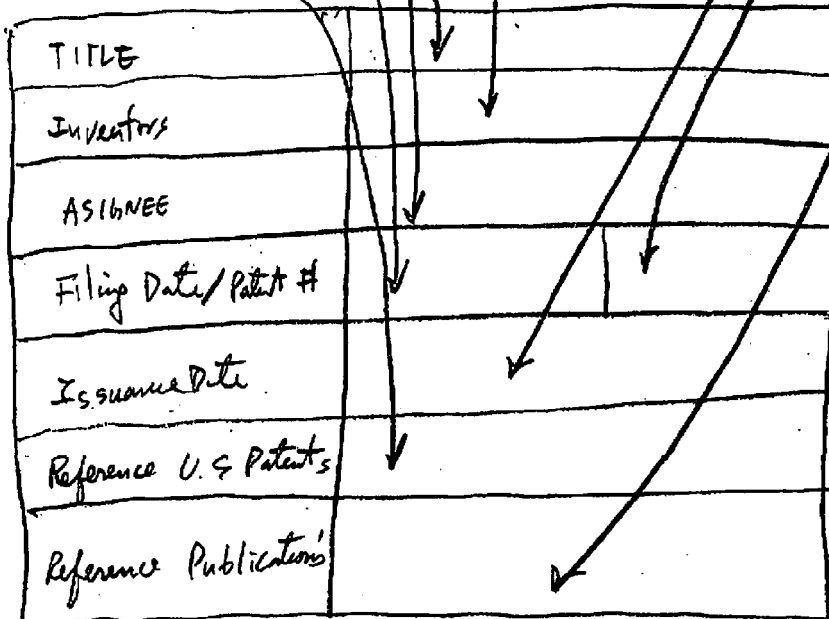
FIG. 3 is a diagram to show a real time construction of a reference document with a user cuts and pastes elements of a document to a reference document for use by a OCR program.

Instead of inputting the reference document 150 as an electronically readable file, another feature of this invention is to allow a user to generate the reference document 150 in real time after a first step of optical character recognition is completed and before the OCR program 125 generates the final output document 140. FIG. 3 illustrates an example of such real time user operation where the top portion shows a partial document generated from an OCR program as the first page of a "first draft" document 160. After the generation of this first draft document 160, e.g., a Microsoft Word document, a user generates a real time reference document 170 by opening a Microsoft Excel document. Then the user "copy and paste" or "drag and drop" data items from the first draft document 160 to different columns and rows of the reference document 170. Based on the actions and patterns of the reference document, the OCR program then generates a final OCR output document by putting additional data into different columns of the Excel file according to the actions taken by the user as shown in FIG. 3.

Figure 4:
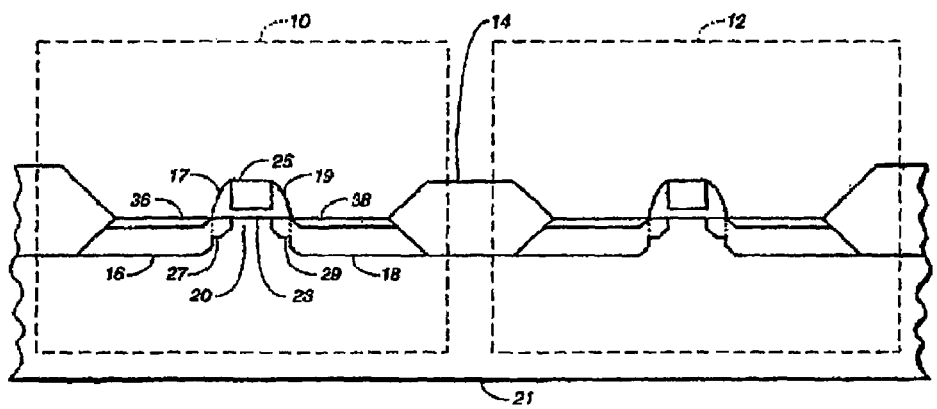
FIG. 4 is a diagram of a document for input to a scanner with a first section as embedded instructions for a scanner/OCR or facsimile/OCR program to process and to carry out functions provided in the embedded instructions in the first section of the image program.

In another preferred embodiment, a scanner program 120 that is implemented as a driver to drive the scanner may also includes an OCR function to optically recognize the first section of an image document such as that shown in FIG. 4. For example the first section of the image document provides an instruction for executing a data compression program to compress the scanned image file as a compressed document and to store this compressed document in a specific storage location in the computer system. The first section of the image document may be setup to provide instructions such that the scanner program can follow the instructions to carry out additional functions. These instructions may include a step to invoke another to carry different functions. These particular functions may or may not relate to the image document captured by the scanner. The first section of the image document may provide an instruction for reading a reference document and use the reference document as a sample to generate the OCR output document as describe above. Another example is to carry out an OCR to convert the image document into a machine-readable file with particular file format and also compress the OCR output document and also the image document into compressed documents to store these two documents into a particle storage device. This operation would therefore automate the archive processes and simplify the document scanning and storage processes without requiring multiple steps of human operations for scanning, compressing and storing the documents. With the image document stored together with the machine-readable file, it further enhance the organization of large amount of data and information because these files will be searchable now with the machine readable files stored together with the image file.

Another application is to apply such scanning/OCR functions into a facsimile device, i.e., a fax machine. The fax machine is connected to a computer to receive an incoming facsimiled image. Immediately after the image file is received, the computer execute an OCR program to recognize the first section of the image file to determine if it contains instructions to carry out further actions. Implementation of such scanner or facsimile machine with optical recognition features to recognized and carry out instruction embedded in the first section of an image document have many applications. A hand written notes can be sent to a home fax to turn on the light or activate a surveillance video camera since such instructions can be embedded in the written note that can be recognized by the computer to invoke predefined functions by a home computer or home security processor. A hand written instruction provided in the first segment of the facsimile image document may include instruction to further fax the image file to a group of people according to a group name store in the computer or instead sending the image file as an attachment to e-mail. A handwritten note or preferably an order form arranged according to a predefined template with blank boxes can be marked by a customer and customer information filled in by a customer by pen or pencil. The customer can send this order form by fax to a store fax. The store fax then automatically recognized the first part of the image document to process the order according the user instruction provided in the first section accordingly. For the purpose of privacy and security, the first section may include a section for password and user name such that the instructions can be processed according to different level of privileges. The fax and OCR order can improve the efficiency than orders by phone because there is no requirement of real human response and such order or execution can be provided with more clarity in writing and also more complicate instruction can be provided. It also provides convenience that a user does not have to log on a networked computer to process these data transmission in order to carry out these transactions.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A computer implemented optical character recognition (OCR) system functioning together with a scanner comprising:
    a user-input function for receiving a user input sample document and storing the sample document in a data storage wherein the OCR system referring to sample document attributes including a specific computer file type or file format and sample structural characteristics wherein said OCR system further applies the scanner for optically inputting and recognizing an image document to generate an output file comprising an output document based on the image document by constructing and generating the output document to have the same computer file type or file format as said user input sample document.

2. The optical character recognition (OCR) system of claim 1 wherein:
    said OCR system optically recognizing said image document and generating an output file comprising the output document based on the image document with substantially a same document structure as the sample structural characteristics of the user input sample document.

3. The optical character recognition (OCR) system of claim 1 wherein:
    said OCR system referring to the user input sample document with a zip computer file type or file format and said OCR system optically recognizing said image document and generating an output file comprising the document based on the image document with the zip computer file type or format same as the input sample document.

4. The optical character recognition (OCR) system of claim 1 wherein:
    said OCR system referring to the user input sample document with a computer file type or file format comprising a multiple-column table and said OCR system optically recognizing said image document for generating an output file comprising the document based on the image document including a multiple-column table with the computer file type or format same as said input sample document.

5. The optical character recognition (OCR) system of claim 1 wherein:
    said OCR system referring to the user input sample document with an EXCEL computer file type or file format comprising a multiple-column table and said OCR system optically recognizing said image document to generate an output file comprising the document based on the image document including an output multiple-column table corresponding to the EXCEL computer file type or format same as said input sample document.

6. The optical character recognition (OCR) system of claim 1 wherein:
    said OCR system using said user input sample document as a reference for generating the output file comprising the document based on the image document by selecting only a portion of said image document according a the sample structural characteristics of said user input sample document.

7. The optical character recognition (OCR) system of claim 1 wherein:
    said OCR system referring to the user input sample document with a textual editable computer file type or file format and said OCR system optically recognizing said image document for generating an output file comprising the document based on the image document with the textual editable computer file type or format same as the input sample document.

8. A computer implemented document processing system for processing a document comprising:
    a user-input function for receiving a user input sample document and storing the sample document in a data storage wherein the sample document having sample document attributes including a computer file type or file format and sample structural characteristics wherein said document processing system processing said document to generate an output document with the same computer file type or file format as said user input sample document.

9. The document processing system of claim 8 wherein:
said document processing system processing said document and generating an output document with substantially a same document structure as the sample structural characteristics of the user input sample document.

10. The document processing system of claim 8 wherein:
said document processing system processing said document and generating an output document with a same computer file type or file format as the sample structural characteristics of the user input sample document.

11. The document processing system of claim 8 wherein:
said user input sample document with a zip computer file type or file format and said document processing system processing said document for generating an output document with the zip computer file type or format same as the input sample document.

12. The document processing system of claim 8 wherein:
said document processing system referring to the user input sample document with an EXCEL computer file type or file format comprising a multiple-column table and processing said document to generate an output document comprising an output multiple-column table corresponding to said EXCEL computer file type or format same as said input sample document.

13. The document processing system of claim 8 wherein:
said document processing system using said user input sample document as a reference for generating the output document by selecting only a selected portion of said document and removing another portion of said document not included in the selected portion according a the sample structural characteristics of said user input sample document.

14. The document processing system of claim 8 wherein:
said document processing system referring to the user input sample document with a textual editable computer file type or file format and said document process system processing said document for generating an output file with the textual editable computer file type or format same as the input sample document.

* * * * *